June 23, 1925.
W. R. PETERSON
DISK HARROW CONTROL
Filed April 20, 1923
1,543,615
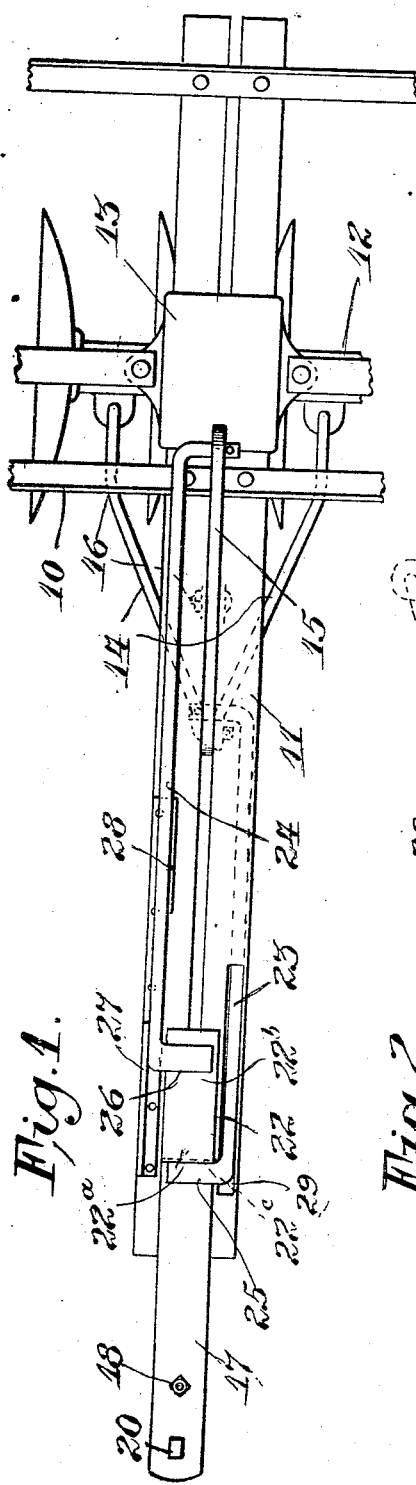
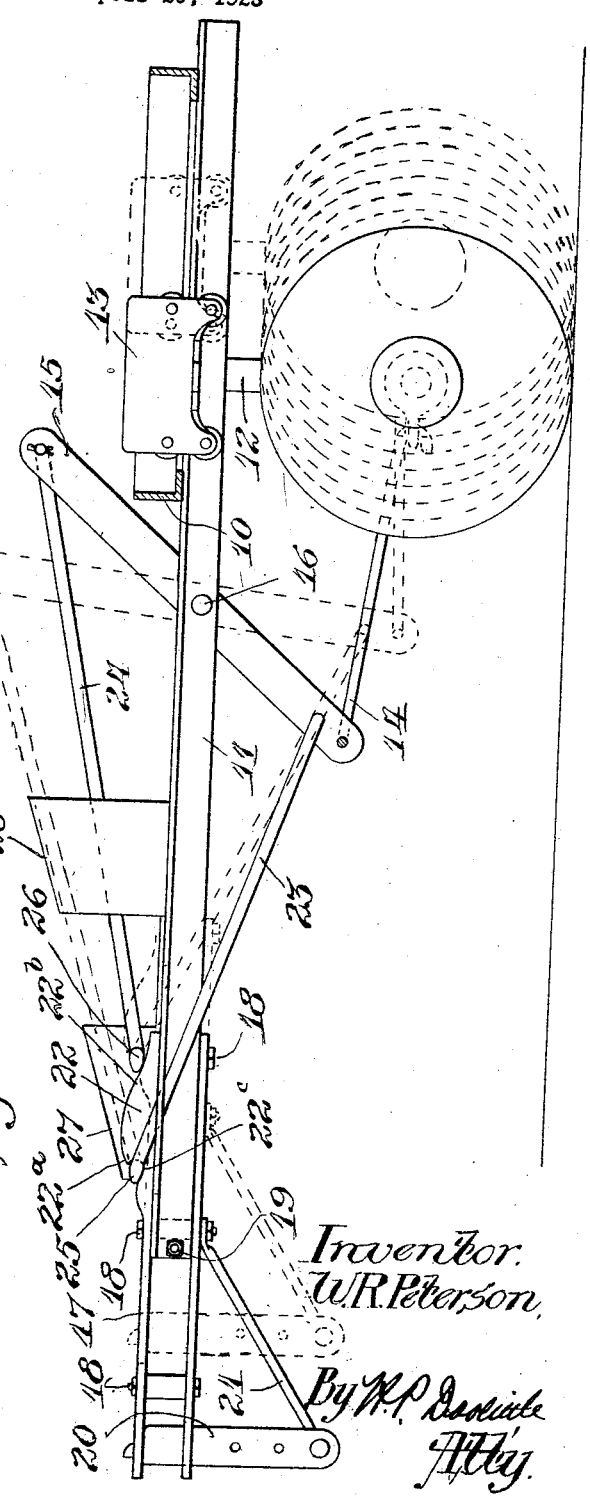
Inventor.
W.R.Peterson,
By W.P.Dadiole
Atty.

Patented June 23, 1925.

1,543,615

UNITED STATES PATENT OFFICE.

WALTER R. PETERSON, OF PARK RIDGE, ILLINOIS, ASSIGNOR TO INTERNATIONAL HARVESTER COMPANY, OF CHICAGO, ILLINOIS, A CORPORATION OF NEW JERSEY.

DISK-HARROW CONTROL.

Application filed April 20, 1923. Serial No. 633,372.

*To all whom it may concern:*

Be it known that I, WALTER R. PETERSON, a citizen of the United States, residing at Park Ridge, in the county of Cook and State of Illinois, have invented certain new and useful Improvements in Disk-Harrow Controls, of which the following is a full, clear, and exact specification.

This invention relates to tractor harrows of the type where the draft power is utilized to effect swinging of the disk gangs to and from working position.

The principal object of the invention is to provide simplified mechanism through which the pull of the tractor will effect either angling or straightening of the gangs as desired and which will operate automatically each time that the tractor is backed slightly and then moved forward.

This object is attained through employment of a movable draft head provided with a notched or grooved cam of novel form acting in conjunction with drawing rods having coupling members cooperating in a novel manner with the cam and notch therein so that each rod is engaged alternately on successive backward movement of the draft head and cam, the other coupling member riding over the one in the notch as the draft head moves forwardly and the draw rods are caused to shift with respect to each other.

With this main and other minor objects in view, the invention resides in the combination and details of construction hereinafter set forth and claimed.

Referring to the drawings—

Fig. 1 is a plan view of the draft tongue and a portion of a disk harrow with my invention applied thereto; and Fig. 2 is a similar side view.

In the present instance, the invention is illustrated as applied to a disk harrow comprising a frame 10, draft tongue 11 and pivotally mounted disk gangs 12. The draft tongue 11 is preferably formed of a pair of slightly spaced angle iron bars secured in any suitable manner to the frame and the inner ends of the gangs 12 are preferably connected by a saddle member 13 which travels back and forth on the rear portion of the draft tongue as the gangs are angled and straightened. The inner ends of the gangs 12 are connected by means of links 14 to the lower end of a lever 15 which is pivoted at its middle, as at 16, to the tongue in the space between the angle bars forming the tongue 11.

The construction so far described is well known and forms no part of my present invention except as it cooperates therewith.

The elements particular to my invention comprise a draft head 17 which may be composed of upper and lower parallel bars connected by spacing bolts 18 as shown in Fig. 2. The bars 17 engage the upper and lower sides of the draft tongue in a manner to be slidable back and forth thereon to an extent limited by the spacing of the two forward bolts 18 which are on opposite sides of a transverse bolt 19 in the forward end of the draft tongue. The sliding draft head is provided with a depending clevis member 20 which may be braced as by rod 21. On its upper side the top bar of the draft head 17 is provided, near its rear end, with an elevated portion or cam 22. This cam is formed to present opposite front and rear inclines 22$^a$, 22$^b$ and, about midway of the front incline, there is provided a hook shaped notch or groove 22$^c$. The means cooperating with the draft head for shifting the gangs to and from working position comprises a pair of shiftable draw rods 23, 24, respectively connected at their rear ends to the ends of the lever 15 as by having their ends bent at right angles and passed through perforations in the ends of lever 15 where they are retained in any suitable manner. These draw rods extend forwardly and have their front ends bent inwardly at right angles and somewhat flattened to give them an oval shape in cross section corresponding to the shape of the engaging notch 22$^c$ in cam 22 in which they are adapted to lie without projecting above the surface of the cam, either one serving to fill or close the notch 22$^c$ when lying therein. These bent ends form the coupling members 25, 26 each of which becomes engaged in notch 22$^c$ in a certain position of the draft head. The ends of the rods 23, 24, constituting the coupling members 25, 26, rest freely on the draft tongue and are free to ride over cam 22 as the draft head is moved backwardly and forwardly by the push and pull of a tractor attached thereto except as they engage the notch 22$^c$, the rods being retained in proper position by any suitable means such as upright standards or plates 27, 28 secured to the draft tongue 11 on opposite sides of the upper rod 24 and a slot 29 in the tongue through which the lower rod 23 extends.

The mechanism above described operates as follows:—Assuming the gangs to be in straightened or nonworking position as in Figs. 1 and 2, the lever 15 will be in such position that the forward end of rod 24 will lie behind the forward end of rod 23 as shown in the figures of the drawing. Now as the draft head is moved rearwardly, the coupling member 25 will ride out of notch 22ᶜ as the draft head moves and the coupling member 26 will slide up over cam 22 until the draft head is moved back to its full extent as indicated in dotted lines on Fig. 2 when coupling member 26 on the end of rod 24 will drop into notch 22ᶜ. Now as the tractor is moved forward and the motion of draft head 17 reverses, the pull will be transmitted to rod 24 the end of which is held in the cam notch thereby swinging the upper end of lever 15 forwardly and forcing the inner ends of the gangs rearwardly into working angle. At the same time, rod 23 shifts rearwardly with respect to rod 24, the coupling member 25 on its forward end riding over the coupling member 26 which fills the notch 22ᶜ and finally reaching the position before occupied by the other coupling member 26. When this action is completed, the gangs will be in working angle and will continue in that position until the draft head is again backed and then moved forward thereby reversing the operation above described and bringing the gangs back to straight or nonworking position.

It will be obvious from the above, that the action of the angling mechanism comprising my invention is wholly automatic and governed entirely by the forward and backward movement of the draft head, successive movements of which serve to swing the lever 15 in opposite directions to alternately angle and straighten the gangs.

While the specific mechanism above described exemplifies the preferred form of my invention, it will be obvious to those skilled in the art that certain modifications may be made within the scope of the following claims.

I claim as my invention:

1. An angling device for disk harrows comprising the combination with the frame and disk gangs, of a pair of relatively shiftable draw rods connected at one end to the gangs by means through which a pull on each rod alternately causes the gangs to angle and straighten, and mechanism for shifting said rods comprising a slidable head piece mounted to reciprocate on the frame, and complemental coupling elements on said head piece and the other ends of said rods including means causing automatic engagement of one rod with said head and release of the other, alternately, on successive reciprocations of said head.

2. An angling device for disk harrows comprising the combination with the frame and disk gangs, of a pair of relatively shiftable draw rods connected at one end to the disk gangs by means through which a pull on each rod alternately causes the gangs to angle and straighten, a draft head movable back and forth on the frame in engagement with the free ends of said rods, and cooperating means on the draft head and rods for automatically coupling the draft head to each rod alternately on successive backward movements of the draft head.

3. An angling device for disk harrows comprising the combination with the frame and disk gangs of a pair of relatively shiftable draw rods connected at their rear ends to the disk gangs by means through which a pull on each rod alternately causes the gangs to angle and straighten, said rods extending forwardly and having their free ends supported on the frame, a draft head movable back and forth on the frame in engagement with said free ends, a notched cam on the draft head, and coupling members on the ends of said draw rods positioned to ride on said cam and formed to engage the notch therein and permit one coupling member to ride over the other as the draft head pulls either rod forwardly.

4. An angling device for disk harrows comprising the combination with the frame and disk gangs, of a lever pivotally mounted between its ends on the frame and connected to the gangs, a draw rod connected to the respective ends of the lever, said rods having their free ends supported by the frame, a draft head movable back and forth on the frame and engaging said ends of the rods, and cooperating means on the draft head and rods for automatically coupling the draft head to each rod alternately on successive backward movements of the draft head.

5. An angling device for disk harrows comprising the combination with the frame and disk gangs, of a lever pivotally mounted between its ends on the frame and connected to the gangs, a slidable draft head provided with an upwardly facing cam having opposite front and rear inclines, the front incline having a notch therein, and a draw rod connected to the respective ends of the lever, each rod having its end positioned to ride on said cam, and means on said rod ends for engaging the notch therein alternately on successive backward movements of the draft head.

In testimony whereof I affix my signature.

WALTER R. PETERSON.